UNITED STATES PATENT OFFICE.

HERBERT H. DOW AND EDWIN O. BARSTOW, OF MIDLAND, MICHIGAN, ASSIGNORS TO THE DOW CHEMICAL COMPANY, OF MIDLAND, MICHIGAN, A CORPORATION OF MICHIGAN.

PROCESS OF MAKING ARSENATE OF LEAD.

1,100,673.  Specification of Letters Patent.  Patented June 16, 1914.

No Drawing.  Application filed June 10, 1911.  Serial No. 632,369.

*To all whom it may concern:*

Be it known that we, HERBERT H. DOW and EDWIN O. BARSTOW, citizens of the United States, and residents of Midland, county of Midland, and State of Michigan, have jointly invented a new and useful Improvement in Processes of Making Arsenate of Lead, of which the following is a specification, the principle of the invention being herein explained and the best mode in which we have contemplated applying that principle, so as to distinguish it from other inventions.

The present improved method of manufacturing lead arsenate involves the precipitation of a soluble arsenate from solution by means of lead chlorid. Moreover, in the specific embodiment of the process under consideration, such chlorid is also used in the form of a solution. The steps involved in carrying out such process will be hereinafter fully described and particularly pointed out in the claims. The following description, however, sets forth in detail but one of the various modes of carrying out the invention, or ways in which the principle of the invention may be used.

As has been indicated, a soluble arsenate and lead chlorid in solution constitute the materials with which the present process is more directly concerned.

Commercial sodium arsenate, which is a convenient soluble arsenate for use in this process, is a mixture of arsenates, containing both acid arsenates $Na_2HAsO_4$ and $NaH_2AsO_4$. If to a solution of such commercial arsenate, a solution of lead chlorid be added, there will indeed be formed a precipitate of arsenate of lead, but the precipitation of the arsenic will not be complete, and after the precipitation, the solution will be found to be acid. This is apparently due to the fact that, working with dilute solutions, corresponding with the sparing solubility of lead chlorid, there is a tendency for the formation of the normal arsenate and free arsenic acid thus:—

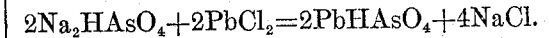

It has been found, however, that by the addition of the proper amount of a suitable alkali, such as soda ash, all the arsenic may be precipitated, the proper amount of alkali being such as will be the equivalent of the hydrogen in the acid arsenate, or mixture of acid arsenates above referred to. This soda ash does not necessarily go immediately into combination with the acid arsenate, since the di-sodium arsenate will not react. The effect, however, after the lead chlorid has been added, is the same as though both acid arsenates had been at once converted into the normal arsenate.

When sufficient base is present, the normal arsenate, $Pb_3(AsO_4)_2$ is obtained as per the following equation:—

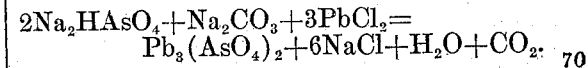

While if less of such base is present, a mixture of the normal and acid arsenates is produced. One reaction which occurs when not enough base is present to produce a normal arsenate has already been given; while a second is $$2Na_2HAsO_4 + 2PbCl_2 = 2PbHAsO_4 + 4NaCl.$$

The lead chlorid solution used in carrying out the process may be prepared in any convenient way, such preparation forming no part of the present process. Any strength of water solution, up to saturation, may be used, a solution containing from three quarters of one per cent. to one per cent. of chlorid being a convenient strength for ordinary purposes.

The process is preferably carried out at ordinary room temperature by charging into a tank provided with a stirrer a quantity of the solution of soluble arsenate, such as the sodium arsenate above referred to, and then adding to this solution, while stirring, the proper amount of solution of lead chlorid to precipitate the arsenate. After the precipitation is complete, the charge is allowed to settle, when the clear solution may be drawn off and the slurry of arsenate of lead run to a filter, or filter press, and the excess of water thereby removed, such arsenate being left in a paste of the desired consistency to meet the requirements of the trade.

For the production of a flocculent slow settling arsenate of lead, which for certain purposes is preferable, a soluble arsenate solution is first prepared, as by adding soda ash (sodium carbonate) solution to a solution of commercial sodium arsenate in the precipitating tank; then stirring such solution and simultaneously adding lead chlorid solution. If, on the other hand, a granular, quick-settling arsenate is desired, the lead chlorid solution may be added to a solution of the commercial arsenate while stirring without first neutralizing the same, and the precipitation be then completed by the addition of the proper amount of soda ash solution with more lead chlorid solution; or the partial precipitate may be separated from the solution and the latter then used for other purposes, or be re-precipitated separately.

The amount of soda ash solution, or of lead chlorid solution, to be added in each of the foregoing operations may be readily calculated from the corresponding reaction formula, as need not be further explained.

This process utilizes lead chlorid as a soluble salt with which to precipitate the arsenate of lead. Said process has the distinct advantage over other processes in that such chlorid of lead may be cheaply manufactured, thus making for the economy of the process.

Other modes of applying the principle of our invention may be employed instead of the one explained, change being made as regards the process herein disclosed, provided the step or steps stated by any one of the following claims or the equivalent of such stated step or steps be employed.

We therefore particularly point out and distinctly claim as our invention:—

1. The method of making arsenate of lead, which consists in adding alkali to a solution of a soluble acid arsenate; and then mixing with the resulting solution a solution of lead chlorid, whereby arsenate of lead is precipitated.

2. The method of making arsenate of lead, which consists in adding alkali to a solution of a soluble acid arsenate, such alkali being added in amount substantially equivalent to the hydrogen in said arsenate; and then mixing with the resulting solution a solution of lead chlorid, whereby arsenate of lead is precipitated.

3. The method of making arsenate of lead, which consists in adding alkali to a solution of acid sodium arsenate, said alkali being added in amount substantially equivalent to the hydrogen in said arsenate; and then mixing with the resulting solution a solution of lead chlorid, whereby arsenate of lead is precipitated.

4. The method of making arsenate of lead, which consists in adding a solution of sodium carbonate to a solution of acid sodium arsenate, said carbonate being added in amount substantially equivalent to the hydrogen in said arsenate; then adding a solution of lead chlorid to the foregoing, whereby arsenate of lead is precipitated; and separating such precipitate from the excess of solution to obtain a paste of the desired consistency.

5. The method of making arsenate of lead, which consists in adding alkali to a solution of a soluble acid arsenate; and then mixing lead chlorid with the resulting solution.

6. The method of making arsenate of lead, which consists in adding sodium carbonate to a solution of acid sodium arsenate, such carbonate being added in an amount substantially equivalent to the hydrogen in such arsenate; and then mixing lead chlorid with the resulting solution.

Signed by us this 6th day of June, 1911.

HERBERT H. DOW.
EDWIN O. BARSTOW.

Attested by—
G. Lee Camp,
D. A. Newland.

Copies of this patent may be obtained for five cents each, by addressing the "Commissioner of Patents, Washington, D. C."